Dec. 25, 1951

A. B. CHUDYK 2,579,648

ELECTRICAL MOTOR CONTROL APPARATUS

Filed Feb. 21, 1949

*INVENTOR.*
ALEX B. CHUDYK

BY

George H Fisher

*ATTORNEY*

Patented Dec. 25, 1951

2,579,648

UNITED STATES PATENT OFFICE 2,579,648

ELECTRICAL MOTOR CONTROL APPARATUS

Alex B. Chudyk, St. Louis Park, Minn., assignor to Minneapolis-Honeywell Regulator Company, Minneapolis, Minn., a corporation of Delaware Application February 21, 1949, Serial No. 77,473

1 Claim. (Cl. 318—207)

The present invention is concerned with an apparatus for reversibly controlling an alternating current induction motor and more particularly a motor of the two phase or split phase type. This is accomplished in the present invention by utilizing an auto transformer for reversibly energizing one winding of the controlled motor.

In some present day control circuits it is desired to utilize electrical amplifiers for detecting a control signal and for reversibly energizing a controlled motor in accordance with the controlled signal. One way in which this may be accomplished is shown in a patent to A. P. Upton, No. 2,423,534, issued July 8, 1947. This Upton patent shows an amplifier directly energizing a reversible two phase or split phase induction motor with one winding of the motor connected to the incoming power line and the other winding of the motor connected directly to the output of the amplifier. In many applications of motor control the Upton arrangement will be very satisfactory; however, there are economical power output limitations on amplifiers of the Upton type and it may be desired to utilize a different arrangement for energizing the same type of motor to obtain more torque output from the same. Such an arrangement must be capable of reversing the phase energization of the control winding of the controlled motor and the arrangement must further not be subject to any appreciable power losses.

It is therefore an object of the present invention to provide a new and improved type of apparatus for reversibly energizing a two phase induction motor.

A further object of the present invention is to provide an apparatus for reversibly energizing a two phase induction motor, which apparatus employs an autotransformer having a pair of inputs which may be alternately energized so that the output voltage on said transformer will reversibly energize the controlled winding of the two phase motor.

Still another object of the present invention is to provide an apparatus for reversibly energizing a split phase induction motor having a pair of energizing windings with the apparatus including a center-tapped autotransformer, which transformer receives its energizing voltage from a further transformer, the latter of which is connected to an alternating source of power.

These and other objects of the present invention will be understood upon a consideration of the following specification, claim, and drawings of which:

Figure 1:
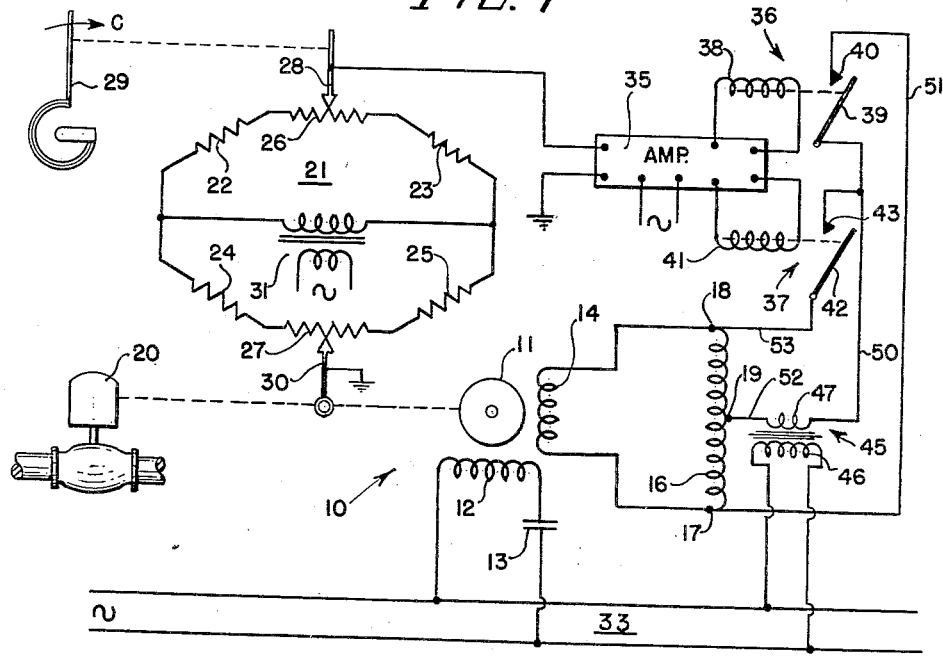
Figure 1 is the basic arrangement of my control apparatus.

Referring to Figure 1 there is shown a diagrammatic circuit of one way in which the apparatus of the present invention may be connected. In this figure the numeral 10 represents a controlled motor and this motor may be of the two phase or split phase type of induction motor. The motor comprises a rotor 11, an energizing winding 12 which is continuously connected to an alternative current input power line of the apparatus through a phase shifting condenser 13. A control winding 14 is also associated with the motor 10 and is energized by an autotransformer 16 having end terminals 17 and 18 and a center tap at 19.

The motor 11 is adapted to reversibly operate a motorized valve 20 in accordance with the electrical control signal originating from a control bridge 21. The bridge network 21 comprises a plurality of fixed resistors 22, 23, 24 and 25, all connected in the arms of the network 21, and a pair of potentiometer slidewires 26 and 27. The slidewire 26 has a slider 28 which may be positioned by any suitable condition responsive device such as a thermostatic device 29, which device is operative to move the slider 28 over the slidewire portion of the potentiometer. The thermostatic device 29 is responsive to a suitable temperature condition which it is desired to have control the position of valve 20. The slidewire 27 has a slider 30 movable thereover, said slider being adjusted by movement of the rotor 11 when the rotor is adjusting the motorized valve 20. Supplying energy to the network 21 is a suitable transformer 31 having its primary winding connected to a suitable source of alternating current power.

The sliders 28 and 30 form the output terminals of the network 21 and the voltage on these output terminals is detected by a suitable amplifier 35 which is of the type in which there are a pair of amplifying stages which are adapted to amplify the alternating current on the output of bridge 21 and this amplified voltage is fed to a pair of phase discriminating tubes one or the other of which will be rendered conductive depending upon the phase of the input voltage. For example this amplifier may be of the type shown in Figure 2 of the above mentioned Upton patent. Located in the output of this amplifier are a pair of control relays 36 and 37. The control relay 36 comprises a relay winding 38, a switch blade 39, and a switch contact 40. The blade 39 is normally biased out of engagement, by means not shown, of the contact 40. The relay 37 comprises a relay winding 41, a switch blade 42 and a switch contact 43. The switch blade 42 is normally biased out of engagement of contact 43, by means not shown. A transformer 45 is provided for supplying an energizing voltage to the autotransformer 16 and this transformer comprises a primary winding 46 and a secondary winding 47. The transformer should have a primary to secondary voltage ratio with an output voltage when applied to the motor winding 14 through the autotransformer will give a voltage magnitude equal to that applied to winding 12 by line 33.

Considering the operation of the present apparatus it will be noted that the bridge network 21 is of the alternating current type and the voltage on the output terminal of the network at sliders 28 and 30 will be of a reversible phase depending upon the relative displacement of the sliders 28 and 30 on the condition responsive and follow up potentiometers. Detecting this output from the network 21, as mentioned above, is amplifier 35 and this amplifier, as pointed out above, is of the phase discriminating type which will energize either relay 36 or 37 depending upon the phase of the output from the network 21. Initially, with network 21 balanced, there will be no output voltage on the amplifier 35 and the relays 36 and 37 will be deenergized. Assume, for example, that the thermostatic device 29 cools and moves the slider 28 toward the right. Assume further that the output voltage on the sliders 28 and 30 is of such a polarity as to cause the relay 36 to be energized by the amplifier 35. When the relay 36 becomes energized the relay winding 38 will move the switch blade 39 into engagement with switch contact 40. When this occurs, an energizing circuit is completed to the lower half of autotransformer 16 from the secondary winding 47 of transformer 45. This energizing circuit may be traced from the right hand terminal of secondary 47 through conductor 50, switch arm 39, switch contact 40, conductor 51, end terminal 17 of autotransformer 16, tap 19, and conductor 52 to the left hand terminal of secondary 47.

With current flowing through the lower half of the autotransformer 16 between the end terminal 17 and the tap 19, there will be an induced voltage in the entire winding of the transformer 16 so that there will be an output voltage between the terminals 17 and 18 which will be twice the voltage applied to the lower half of the autotransformer. This output voltage will be applied directly to the winding 14 and its magnitude will be equal to that applied to winding 12.

It will be noted that the motor winding 12 and phase shifting condenser 13 are connected in series to the line 33. This will mean that in the series circuit the voltage existing across the winding 12 may be about twice the magnitude of the line voltage on 33 and the current flow will be in phase with the line voltage. Since there is only resistance and inductive reactance in the circuit of winding 14, the current flowing therein will be either leading or lagging that flowing in winding 12 by a theoretical 90° displacement. Actually, the phase displacement will be somewhat less than this but will be sufficient to cause rotation of the rotor 11. The actual voltage magnitude applied to the winding 14 will be twice that appearing on secondary 47. Obviously, the transformer 45 may be eliminated if the desired voltage ratios are obtainable by a direct connection of conductors 58 and 52 to the input power line 33. The phase of the voltage applied to the winding 14 will be such that the current flow in the winding will rotate the rotor 11, under the assumed conditions, in a direction to move the slider 30 toward the right which tends to balance the electrical network 21 and to open the motorized valve 20 so as to allow the passage of a greater amount of heating medium to the space wherein the thermostatic device 29 is located. As soon as the rotor 11 has moved far enough to move the slider 30 to the position wherein it balances the network 21, there will be no output voltage from the network 21 and therefore there will be no unbalance voltage on the amplifier 35 tending to energize either of the relays 36 and 37. This will mean that both of the relays 36 and 37 will be in the deenergized position.

When the temperature condition of the thermostatic device 29 has been restored, the device 29 will move the slider 28 back toward its original position. When this occurs, there will be an unbalance on the network 21 and the phase of this unbalance will be opposite the phase assumed above. With this phase unbalance on the output sliders 28 and 30, the amplifier 35 will be operative, upon sensing this unbalance, to energize the relay 37. When the relay 37 becomes energized the relay winding 41 will move the switch blade 42 into engagement with switch contact 43 to complete an energizing circuit to the upper half of the autotransformer 16 and this energizing circuit may be traced from the right hand terminal of secondary 47 through conductor 50, switch contact 43, switch blade 42, conductor 53, end terminal 18, the upper half of autotransformer 16, tap 19 and conductor 52 to the left hand terminal of secondary 47.

With the upper half of the autotransformer 16 energized, an output voltage will appear across the entire autotransformer 16 at terminals 17 and 18 and this voltage will be of a phase opposite the phase of the output voltage when the lower half of the transformer was energized. With this phasing, the winding 14 will be energized in the opposite direction to cause the rotor 11 to move the slider 30 back to a balanced position. As the slider 30 is moved back to the balanced position the motorized valve 20 will be moved back toward a closed position. As soon as network 21 is again balanced and there will be no output voltage fed to the amplifier 35 and therefore the relays in the output of amplifier 35 will become deenergized, as they are shown upon the drawing.

In the event that there should be faulty operation of relays 36 and 37 so that both were energized at the same time, the autotransformer will have a voltage applied thereto on both upper and lower sections and the voltage will be acting in opposition on the winding. The result will be no output voltage and there will be no heating of the motor winding 14 to cause damage thereto.

Figure 2:
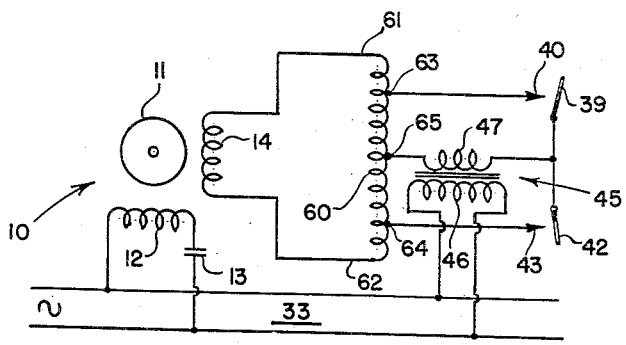
Figure 2 is a modification of Figure 1.

Should it be desired to energize the motor winding with a greater voltage when it is to rotate in one direction then the other, it is not necessary to move the tap 19 in a direction to give a greater voltage step up when the associated portion of the autotransformer is energized. For example, if it is desired that the closing of relay 37 cause energization of the winding 14 with a larger voltage than when the relay 36 closes it is necessary to move the tap 19 toward the upper terminal 18 which movement will result in fewer turns between tap 19 and terminal 18 than between tap 19 and terminal 17. This will mean a higher voltage across terminals 17 and 18 when the upper half of the winding 16 is energized. In Figure 2, there is shown a modification of the circuit of Figure 1. In the modification it is possible to accomplish essentially the same type of operation as in Figure 1 except that the relay contacts are able to operate in a much lower voltage circuit. This may be of particular advantage in high altitude work where it is desirable to keep switch contact potentials at a relatively low value to prevent breakdown.

Components of Figure 2 corresponding to those in Figure 1 carry the same reference numerals. In Figure 2 a different autotransformer 60 has been provided. Here the autotransformer 60 has a pair of output terminals 61 and 62, two input terminals 63 and 64 and a center tap 65. In the transformer 45 the primary to secondary voltage ratio will be greater than that assumed in Figure 1 as here it is desired that switch contacts 39 and 40, and 42 and 43 be operating in a lower voltage circuit than in Figure 1.

In the operation of Figure 2 the apparatus as shown with the switch contacts open so that no voltage will be applied to the autotransformer 60. Should the switch blade 39 move into engagement with contact 40 an energizing circuit will be completed to the upper input section of the autotransformer 60 between terminal 63 and tap 65. With this section energized there will be an output voltage on terminals 61 and 62. The phase of this voltage will be such as to cause the rotor 11 to rotate in one direction. The magnitude of the voltage will of course be determined by the ratio of turns in the autotransformer between the terminal 63 and tap 65 as compared to all the turns of the transformer. When the contacts open the rotor should stop.

When the switch arm 42 engages switch contact 43 the autotransformer will be energized between terminal 64 and tap 65. This energization will result in a reversal in the output phase on terminals 61 and 62 and the motor will rotate in the opposite direction. Obviously the relative voltage magnitude may be varied by varying the turn ratios on the autotransformer.

From the foregoing it may be seen that there has been provided a new apparatus for reversibly energizing a two phase or split phase induction motor. This apparatus eliminates the necessity of designing a control amplifier with a high power output for use in driving the motor directly and further provides a flexible apparatus where it is possible to use low voltage switching circuits for reversibly energizing a high voltage motor winding. While a specific embodiment of the invention is shown, it is to be understood that it is for illustrative purposes only and I intend, therefore, to be limited solely by the scope of the appended claim.

I claim as my invention:

Motor control apparatus comprising in combination; a two-phase reversible induction motor of the capacitor type having two energizing windings, an alternating current power source, means connecting a first of said windings to said source through a capacitor so that the voltage across said winding is displaced in phase with respect to said source and substantially greater in value than said source, a center tapped autotransformer winding connected across the other motor winding and having primary portions extending over not more than half of the entire winding, a pair of switches one for each desired direction of rotation of said motor, means for obtaining from said power source a voltage of such value that when applied to a primary portion of said autotransformer, the voltage across the total winding of said autotransformer is substantially equal to that across said first of said motor windings, and a pair of low voltage controlling circuits each including voltage obtaining means, one of said switches, and one of the primary portions of said autotransformers.

ALEX B. CHUDYK.

REFERENCES CITED

The following references are of record in the file of this patent:

UNITED STATES PATENTS

| Number | Name | Date |
|--------|------|------|
| 808,944 | Porter et al. | Jan. 2, 1906 |
| 1,794,508 | Baughman | Mar. 3, 1931 |
| 1,954,657 | Welsh | Apr. 10, 1934 |